United States Patent [19]

Vezzoli et al.

[11] Patent Number: 5,246,115
[45] Date of Patent: Sep. 21, 1993

[54] PROCESS FOR SEPARATING HETEROGENEOUS PLASTIC MATERIAL INTO HOMOGENEOUS FRACTIONS AND APPARATUS USEFUL TO THIS PURPOSE

[75] Inventors: Annibale Vezzoli, Como; Marino Lamperti, Milan; Francesco Milani; Bruno Albrisi, both of Varese, all of Italy

[73] Assignee: Centro Sviluppo Settori Impiego S.r.l., Italy

[21] Appl. No.: 738,752

[22] Filed: Aug. 1, 1991

[30] Foreign Application Priority Data

Aug. 1, 1990 [IT] Italy ................. 21162 A/90

[51] Int. Cl.⁵ .................. B03B 1/04; B03B 5/28
[52] U.S. Cl. ............................. 209/2; 209/3; 209/4; 209/172
[58] Field of Search ............ 209/2, 3, 4, 7, 9, 10, 209/11, 156, 172, 172.5, 173, 930, 166

[56] References Cited

U.S. PATENT DOCUMENTS

| | | | |
|---|---|---|---|
| 4,119,533 | 10/1978 | Saitoh et al. | 209/173 X |
| 4,132,633 | 1/1979 | Saitoh et al. | 209/9 |
| 4,167,477 | 9/1979 | Valdez et al. | 209/166 |
| 4,617,111 | 10/1986 | Grimm et al. | 209/2 |
| 4,830,188 | 5/1989 | Hannigan et al. | 209/172.5 X |
| 5,022,985 | 6/1991 | Nugent | 209/172.5 |

FOREIGN PATENT DOCUMENTS

| | | | |
|---|---|---|---|
| 363051 | 10/1981 | Austria | |
| 2122 | 11/1977 | European Pat. Off. | 209/3 |
| 1278100 | 9/1968 | Fed. Rep. of Germany | |
| 2900666 | 7/1980 | Fed. Rep. of Germany | 209/211 |
| 3210972 | 10/1983 | Fed. Rep. of Germany | |
| 3508504 | 9/1985 | Fed. Rep. of Germany | |
| 2263824 | 10/1975 | France | |
| 2281166 | 3/1976 | France | |
| 44812 | 3/1980 | Japan | 209/3 |
| 1552118 | 10/1975 | United Kingdom | 209/3 |
| 2191118 | 12/1987 | United Kingdom | |

OTHER PUBLICATIONS

European Search Report, EP 91 30 7065, The Hague, Feb. 18, 1992.

*Primary Examiner*—Donand T. Hajec
*Attorney, Agent, or Firm*—Morgan & Finnegan

[57] ABSTRACT

A process is taught for separating heterogeneous plastic material into homogeneous fractions, which comprises:
a. feeding the plastic material in a triturated form to a first water-containing separation tank to separate the high specific weight products from the low specific weight products;
b. recovering the mixture of high specific weight products from the bottom of said first separation tank and drying them in a first drier;
c. treating the resulting mixture with a chemical agent capable of swelling/modifying the plastic materials which are sensible to said chemical agent; and
d. drying the products so treated and feeding them to a second separation tank, in which the nonswollen/nonmodified plastic material precipitates while the remaining material, maintained on the surface, is discharged.

12 Claims, 1 Drawing Sheet

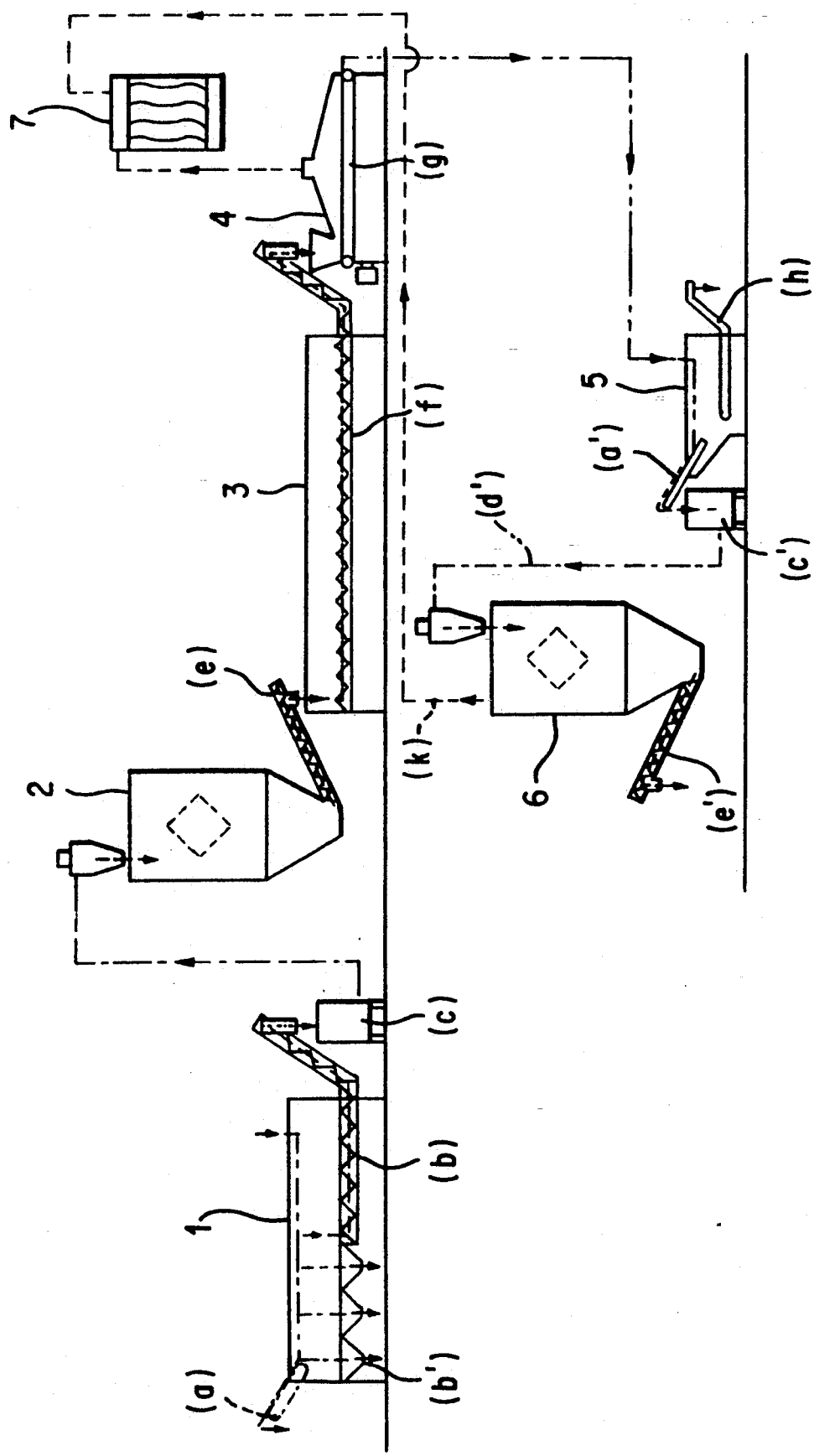

PROCESS FOR SEPARATING HETEROGENEOUS PLASTIC MATERIAL INTO HOMOGENEOUS FRACTIONS AND APPARATUS USEFUL TO THIS PURPOSE

FIELD OF THE INVENTION

The present invention relates to a process for separating heterogeneous plastic material into homogeneous fractions.

More in particular, the present invention relates to a process for separating heterogeneous plastic material into families of materials which are thermally consistent with one another, and to an apparatus suited to the purpose.

Even more in particular, the present invention relates to a process for separating heterogeneous plastic material into two fractions, one fraction substantially containing polyethylene terephthalate and the other fraction substantially containing polyvinylchloride.

BACKGROUND OF THE INVENTION

The term "heterogeneous plastic material", whenever used in the present specification and in the claims, means a mixture of thermoplastic and thermosetting polymers such as (high, medium, low density) polyethylene, polypropylene, polystyrene, foamed polystyrene, PVC, PET, ABS, polyester resins, polyamides, etc., obtained, after a first separation, from town solid wastes, or from a differentiated collection or deriving from the conversion industry as production wastes.

Reasons of ecological and environmental nature have led to take into due consideration the serious problem of the disposal of the plastic materials which are present in the town solid wastes.

In Italy, at present, the production of town solid wastes is growing by about 1% per year, and now it is evaluated at 18/20 million tons per year, 1.4 million tons of which (about 7.5%) are plastics.

The recycle of said high amount of material would allow to recover the residual use value thereof. That would result in economical advantages and, above all, in a decrease in the total waste volume and in the fresh material consumption. Furthermore, the possibility would be maintained to recover the respective energy content when, at the end of the life cycle, said material will be incinerated in a furnace according to a technology suitable for heat recovery.

A very important solution, from the applicability point of view, consists in the reuse of each component of the heterogeneous mixtures in combination with fresh products or in the selection of homogeneous fractions for the production of shaped bodies having physical/mechanical properties much higher than those of identical shaped bodies obtained from unselected mixtures.

The main problem associated with the recycling of the recovery plastic material is that of separating it into homogeneous fractions, preferably for the same type of polymer or, at least, for polymers thermally consistent with one another, by means of continuous and as much as possible automated processes.

At present, the mixes of recovered plastic material are substantially composed of polyolefins such as polyethylene, polypropylene, etc., which are almost always present in amounts greater than about 20% by weight, generally from 40% to 50%, of a mix substantially consisting of polyvinyl chloride (PVC), polystyrene, polyethylene terephthalate (PET), which in the aggregate represents about 50-60%, and of about 0-10% by weight of other products such as thermosetting resins, ABS, rubbers, acrylic resins, polyamides, etc.

The separation of these mixes by usual water flotation processes has provided not to be useful, because materials essentially consisting of polyolefins compatible with one another, float on the surface, while high specific weight materials, which comprise two reciprocally incompatible polymers such as PET and PVC, precipitate to the bottom.

PVC and PET are incompatible with each other as they are characterized by different processing temperatures in the molten state. In fact, PET melts at about 265° C. while PVC, as is stated in "The Condensed Chemical Dictionary (Tenth Edition)" Gessner G. Hawlay, Van Nostrand Reinhold Company, 1981, decomposes at 148° C. and generates toxic gases.

SUMMARY OF THE INVENTION

The applicants have now found a process which permits to continuously and automatically separate a mix of plastic materials, in particular having a high specific weight, into two fractions, one fraction essentially containing PET and the other fraction essentially containing PVC.

Thus, it is an object of the present invention to provide a process for separating heterogeneous plastic material into families of reciprocally compatible materials, said process comprising:

a) feeding triturated plastic material to a first water-containing separation tank to separate high specific weight products from those having a low specific weight;

b) recovering the mix of high specific weight products from the bottom of said first separation tank and drying them in a first drier;

c) treating the resulting mix with a selective chemical agent capable of swelling/modifying a fraction consisting of polymers which are substantially compatible with one another; and d) drying the products so treated and feeding them to a second separation tank, in which the nonswollen/nonmodified plastic material precipitates, while the remaining material, maintained on the surface, is discharged.

BRIEF DESCRIPTION OF THE DRAWING

The invention will be described with respect to the drawing which is not considered to limit the invention. The drawing is a schematic representation of the present invention.

DETAILED DESCRIPTION OF THE INVENTION

More in particular, the process of the present invention, which may be continuous or discontinuous, comprises a first step, in which the mixture of heterogeneous plastic material is separated into two fractions:

the first fraction being composed of products having a specific weight lower than the one of water and essentially consisting of polyolefins, such as polyethylene and polypropylene, and of a foamed polystyrene;

the second fraction being composed of products having a specific weight greater than the one of water and essentially consisting of compact polystyrene, PVC and PET.

While the first fraction comprises materials which are thermally compatible with one another and therefore can be utilized again without the need of further separations, the second fraction comprises two materials such as PVC and PET which are incompatible with each other and should preferably be separated prior to their possible reuse.

According to a preferred embodiment of the process of the present invention, it is possible to operate in such a manner as to recover a heavy fraction, already enriched in PVC and PET, from the bottom of the first tank.

To obtain this result, the first tank is fed with recirculating water, which generates a stream flow inside said tank.

In this condition, the high specific weight materials contained in the heavy fraction, such as PVC and PET, precipitate almost immediately, while the other materials, belonging to the heavy fraction and having specific weights close to that of water, for example polystyrene, are dragged, during their precipitation, by the stream flow and deposit onto the tank bottom in areas well distinct from the ones onto which the PVC and PET containing mix deposits. Proper means permit to separately recover the heavier fractions from the less heavy fractions.

The fraction recovered from the bottom of the separation tank, possibly enriched in PVC and PET, is dried and then treated with a chemical agent capable of swelling/modifying a portion of said fraction consisting of polymers substantially compatible with one another.

In particular, it is preferable to choose a chemical agent capable of attacking a material such as PVC, with the exception of PET, which, as is known, exhibits a high chemical resistance. The swollen material will exhibit an increase in the original volume, which will result, as a consequence, in a decrease in the relevant specific weight.

Chemical agents capable of operating in this sense are represented by swelling agents for plastic materials, preferably liquid agents, having solvent action. Examples of such solvents are the ketones such as acetone, methylethylketone, cyclohexanone, etc., dimethylformamide, and the chlorinated solvents such as methylene chloride; the preferred product being acetone.

The treatment with the chemical agent can be conducted at room temperature or at a higher temperature, for example from 40° to 100° C., for contact times which depend on the temperature, but generally range from 5 to 60 minutes.

At the end of the treatment, the plastic material sensible to the action of the swelling agent will appear, as a function of the treatment time, either completely swollen or only superficially altered. In both cases, it is advisable to recover the swelling agent.

Any method useful to remove a solvent either impregnated or adsorbed on a plastic material can be utilized in the process of the present invention, although the drying-by-heat method at a temperature ranging from 25° to 60° C., optionally in the presence of air circulation, is preferred.

At the end of the drying treatment, the mix of heterogeneous high specific weight plastic material is composed of a portion of unaltered material consisting, for example, essentially of PET, and of a portion of modified material, essentially consisting of PVC and, optionally, polystyrene.

Said mix can be separated gravimetrically or by flotation.

More in particular, for fully swollen polymers, the separation can occur gravimetrically in a second separation tank containing a fluid having density greater than the one of the modified polymer.

A fluid which is suited to this second separation can be selected from the ones having a density preferably ranging from 1 to 1.1 $kg/dm^3$, extremes included, such as water/sodium chloride mixtures, water/nonfoaming surfactants mixtures, etc.

Conversely, for only superficially modified polymers, the separation can occur by flotation, causing air or another gaseous vehicle, such as nitrogen, carbon dioxide, etc., to bubble in the fluid contained in said second separation tank. The materials altered by the chemical treatment, because they have a rough surface, do not precipitate as they are kept on the surface by the bubbling, while the other materials, having a smooth surface, precipitate because they offer no hold to the bubbling.

An alternative separation technique, which is particularly suited when the plastic material is treated with the chemical agent for short times sufficient only to soften the surface of the sensible portion, consists in evaporating the swelling agent which wets the material surface, while retaining the adsorbed agent.

The plastic material still containing adsorbed swelling agent is tacky and therefore it can be treated with low specific weight powders, which adhere thereon, while they slip on the material resistant to the action of the chemical agents.

Examples of low specific weight powders are represented by microspheroidal silica, alkaline and/or alkaline-earth silicates, carbonates, etc., in the foamed form.

The so treated plastic material mix can be separated gravimetrically because the material modified by the swelling agent is maintained on the separation fluid surface due to the floating effect of the light powders.

Another object of the present invention is an apparatus for separating heterogeneous plastic material into homogeneous fractions which comprises:

1) a first water-containing separation tank equipped with means suitable for recovering the floating material and the sunk material;

2) a first drier to dry the plastic material recovered from the bottom of said first separation tank;

3) a vessel containing a selective chemical agent capable of swelling/modifying a fraction of said heterogeneous plastic material, which fraction consists of polymers substantially compatible with one another;

4) a second drier to remove the chemical agent impregnated with the plastic material;

5) a second separation tank containing a fluid having a known density, to separate the swollen/modified plastic material from the nonmodified material; and 6) an optional third drier for the modified plastic material, which drier is capable of removing the last solvent traces.

According to a preferred realization of the apparatus of the present invention, the separation tanks have substantially a parallelepiped form with dimensions which depend on the amounts of plastic material to be treated. However, tanks having a length from 2 to 6 meters, a height and a width from 0.5 to 2 meters are the most suitable for the present invention.

The vessel containing the chemical agent preferably consists of a pipe, the dimensions thereof depend on the amount of plastic material to be treated. Pipes having diameters from 0.5 to 1 meter and lengths from 3 to 10 meters, in the inside of which the plastic material moves, pushed by a screw conveyor, are utilizable in the present apparatus.

The constructive and functional characteristics of the apparatus for separating heterogeneous plastic material into homogeneous fractions, which is the object of the present invention, can be better understood from the following detailed description in which reference is made to the annexed figure.

With reference to the figure, the apparatus object of the present invention comprises:

a first separation tank (1) equipped with a semisubmerged conveyor belt (a), a screw conveyor (b) and collecting areas (b') located on its bottom;

a collecting vessel (c) connected to a transfer line, for example, a pneumatic transfer line (d);

a first drier (2) connected, on the bottom, to a screw conveyor (e);

a tubular vessel (3) containing the modifying or dissolving chemical agent and a screw conveyor (f);

a second drier (4) of the belt (g) type, equipped with a vapor condenser (7) for a possible recycle of the chemical agent;

a second separation tank (5) equipped with a semisubmerged conveyor belt (a') and with a screw conveyor (h) located on the bottom;

a collecting vessel (c') connected, through a transfer line (d'), to a third drier (6) which, in turn, is connected on the bottom to a screw conveyor (e'). Solvent residues, if any, are recycled to condenser (7) through line (k).

The annexed figure and the following description clearly illustrate the operation of the present apparatus.

The heterogeneous plastic material, charged to the first separation tank (1), in the inside of which a water recycle generates a stream flow, is divided into two fractions: the light one, which floats, being recovered by belt (a), while the heavy fraction precipitates onto the tank bottom.

In particular, the high specific weight materials contained in the heavy fraction, such as PVC and PET, precipitate almost immediately and are recovered by screw conveyor (b), other materials, such as polystyrene, having a specific weight close to the one of water, are dragged, while precipitating, by the stream flow and deposit in the collecting areas (b'), from which they are recovered by means which are not shown in the figure.

The heavier fraction, essentially consisting of PVC and PET, is collected in (c), wherefrom it is sent to a first drier (2) in order to eliminate the water.

By screw conveyor (e), the heavier fraction is fed to vessel (3) containing the chemical agent suited to swell, for example, PVC.

After a residence time, which is depending on the type of the chemical agent and on the temperature, at which the treatment is carried out, the heavy fraction containing the swollen/modified portion enters drier (4), which contains conveyor belt (g), for the recovery of the chemical agent, which is condensed in (7).

The so treated plastic material mix is conveyed to the second separation tank (5), in which PVC (and other swollen materials, if any), which floats, is separated from PET, which precipitates, as it has remained unaltered. The latter is recovered by means of screw conveyor (h), while PVC, recovered by belt (a'), is sent to the last drier (6) in order to remove also the last solvent traces, if still present.

When carrying the present invention into effect, various changes, modifications and variations can be brought to the various parts which form the apparatus for separating heterogeneous plastic material into homogeneous fractions, which is illustrated, as an example, in the drawing of the annexed figure, without departing from the spirit and the scope of the present invention.

We claim:

1. A process for separating heterogeneous plastic material into families of reciprocally compatible materials, which comprises:
   a. feeding triturated plastic material to a first water-containing separation tank, to separate high specific weight products from those having a lower specific weight;
   b. recovering the high specific weight products from the bottom of said first separation tank and drying them in a first drier;
   c. treating the resulting high specific weight products with a selective chemical agent for swelling and modifying a fraction consisting of polymers which are substantially compatible with one another; and
   d. drying the products so treated and feeding them to a second separation tank, in which the nonswollen and nonmodified plastic material precipitates, while the remaining swollen and modified fraction, maintained on a surface provided in said second tank, is discharged.

2. The process according to claim 1, wherein the first separation tank is fed with recirculation water which generates a stream flow in said tank.

3. The process according to claim 1, wherein the chemical agent is a swelling agent for plastic materials.

4. The process according to claim 3, wherein the chemical agent is acetone.

5. The process according to claim 1, wherein the treatment with the chemical agent is conducted at room temperature or at a greater temperature for contact times ranging from 5 to 60 minutes.

6. The process according to claim 1, wherein impregnated or adsorbed solvent is removed from the plastic material by drying at a temperature ranging from 25° to 60° C., optionally in the presence of air circulation.

7. The process according to claim 1, wherein the treated products are separated either gravimetrically or by floatation in said second separation tank.

8. The process according to claim 1, wherein the separation in the second separation tank is conducted in the presence of a fluid having a greater density than the one of the modified polymer.

9. An apparatus for separating heterogeneous plastic material into homogeneous fractions, which comprises:
   a. a first water-containing separation tank equipped with means for recovering floating material and sunk plastic material;
   b. a first drier to dry the plastic material recovered from the bottom of said first separation tank;
   c. a vessel containing a selective chemical agent for swelling and modified a fraction of said plastic material recovered from the bottom of said first tank, which fraction consists of polymers essentially compatible with one another;
   d. a second drier to remove the chemical agent, which is impregnated with the plastic material;

e. a second separation tank containing a fluid having a known density to separate the swollen and modified plastic material from the non-modified one; and f. an optional third drier for the swollen and modified plastic material for eliminating the last traces of solvent.

10. The apparatus according to claim 9, wherein the separation tanks exhibit a substantially parallelepiped form with dimensions which depend on the amounts of plastic material to be treated.

11. The apparatus according to claim 9, wherein the chemical agent-containing vessel consists of a pipe, the dimensions thereof depend on the amount of plastic material to be treated.

12. The apparatus according to claim 3, wherein the swelling agent is a liquid agent acting as a solvent.

* * * * *

UNITED STATES PATENT AND TRADEMARK OFFICE
CERTIFICATE OF CORRECTION

PATENT NO. : 5,246,115
DATED : September 21, 1993
INVENTOR(S) : VEZZOLI et al.

It is certified that error appears in the above-identified patent and that said Letters Patent is hereby corrected as shown below:

On title page, item [73] Assignee:
should read as follows:

[73] Assignee: Centro Sviluppo Settori Impiego S.r.l.
and Milani Resine S.p.A.

Signed and Sealed this

Twenty-seventh Day of February, 1996

Attest:

BRUCE LEHMAN

Attesting Officer  Commissioner of Patents and Trademarks